J. FABIAN.
GAS PRESSURE REGULATOR.
APPLICATION FILED FEB. 26, 1913.
1,180,638.
Patented Apr. 25, 1916.
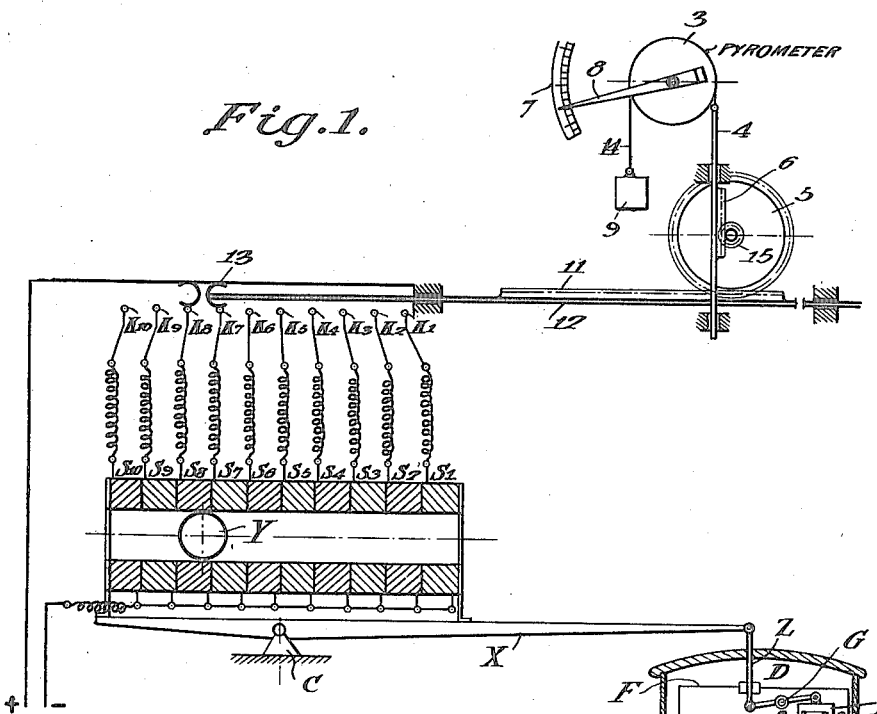
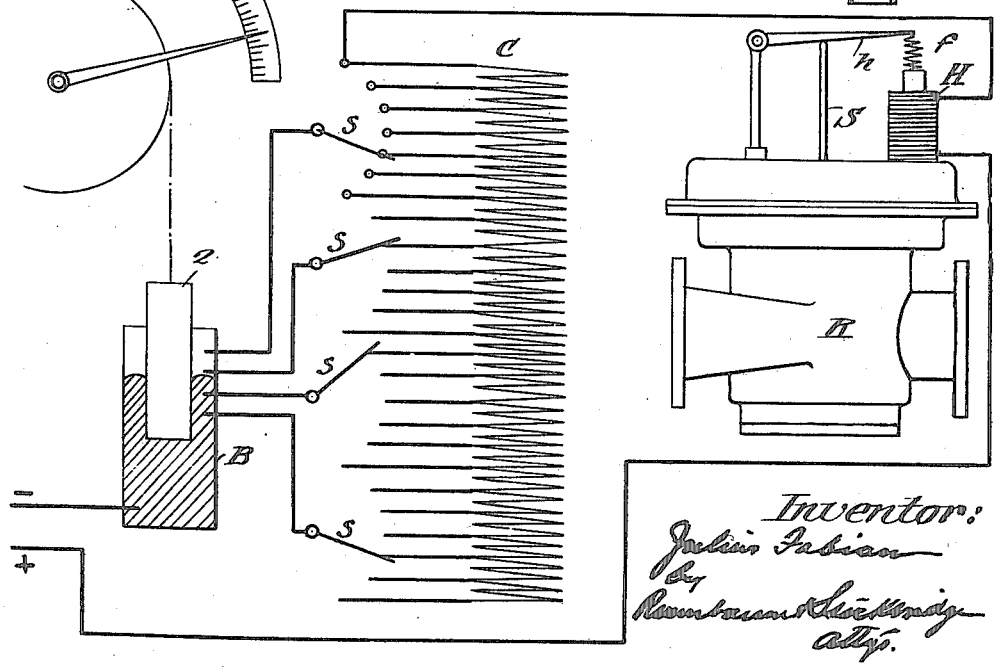

UNITED STATES PATENT OFFICE.

JULIUS FABIAN, OF WILMERSDORF, GERMANY.

GAS-PRESSURE REGULATOR.

1,180,638. Specification of Letters Patent. Patented Apr. 25, 1916.

Application filed February 26, 1913. Serial No. 750,878.

*To all whom it may concern:*

Be it known that I, JULIUS FABIAN, engineer, a subject of the German Emperor, King of Prussia, and a resident of Wilmersdorf, Province of Brandenburg, Kingdom of Prussia, German Empire, have invented new and useful Improvements in Gas-Pressure Regulators, of which the following is a specification.

The present invention refers to improvements in gas pressure regulators.

Gas pressure regulators which are capable of variable adjustment dependent on the consumption which takes place at any given moment in the mains behind the regulator are well known. If the consumption in the mains increases, the valves of the regulators fall and the falling of the valves causes an additional pressure on the regulator, which pressure increases in accordance with the further falling of the valves.

This invention consists in controlling this additional pressure by other means as well as by the consumption so as to obtain a regular heating effect of the gas. These include the calorific value of the gas upon which the temperature produced in a flame depends. If we consider for instance the heating burner of a boiler it will be seen that, as regards the temperature of the flame, this temperature is influenced by the pressure of the gas in the mains, by the calorific value of the gas, and by the draft of the chimney, or artificial draft installation. All these phenomena have an influence on the heat of the flame under consideration. By the use of a pyrometer, the adjustment of the regulator can be effected directly if need be by the degree of heat in the flame of the gases, air or the like. According to this invention, the gas pressure is controlled electrically, or mechanically, in such a manner that the aforesaid conditions are taken into account in securing a uniform heat; consequently it is necessary to so control the burner that when the calorific value rises, or falls, or is altered by the draft, it will respond to such variations. The installation utilizing gas is not limited to a boiler as the installation may consist of metallurgical furnaces, coke oven sets, or the like, the essential feature being that when one of the aforesaid means rises, or falls, a switching device is set in motion which effects the raising, or lowering, of the regulator.

The invention is not limited to the controlling of the regulator as shown in the accompanying drawings, which merely illustrate by way of example a few arrangements in accordance with this invention. For instance when it is desired to measure the heating effect of the flame by means of a pyrometer built in the heating device, the pyrometer is caused to close an electric circuit which alters the pressure on the regulator according as a certain degree of heat is attained, or exceeded. So long as the circuit is closed the regulator is subjected to a variable pressure until the desired degree of heat is obtained by the passage of more or less gas.

Figure 1 is a diagrammatic representation of one form of my invention, and Fig. 2 is a similar view of a modified form of the invention.

Referring first to Fig. 1, a lever X is fulcrumed at C and is connected at one end in any suitable manner with the spindle Z of a gas regulator of the well known construction broadly designated D consisting of a small inverted cup E and a larger inverted cup F, the depending edges of which dip into mercury as shown, and being connected by the lever G. In devices of this character the depending edge of the small valve E is usually notched or slotted, but for the purposes of the present invention it is thought to be unnecessary to illustrate this feature herein. H' is the inlet pipe and I the outlet pipe. An upward movement of spindle Z lifts cup F and thereby depresses cup E, through the instrumentality of lever G, so that the area of the slot therein is decreased and the flow of gas correspondingly decreased. A downward movement of spindle Z has the opposite effect. Mounted upon lever X are a plurality of solenoids, ten of which are shown, and which are designated $S_1$ to $S_{10}$, respectively. Between the poles of the solenoids a ball Y of steel or other magnetic material is confined but free to travel past the poles of the solenoids. Contacts are provided for each of the solenoids $S_1$ to $S_{10}$, which contacts have been designated $K_1$ to $K_{10}$, through which the solenoids may be energized when connected with a suitable source of current supply through the sliding contact 13 on the rod 12. The contact 13 is controlled by a calorimeter or pyrometer, not shown, which is affected by the heat of the flames which are to be regulated. It is to be noted that the contact 13 is so constructed that it will always engage two of the contacts $K_1$, etc. A pulley 3 is actuated by the pyrometer and provided with a pointer 8 and scale 7. A cord 14 passes over pulley 3 and carries a rod 4 on one side and a counterbalancing weight 9 on the other. Rod 4 is provided with a rack 6 on one side, which meshes with a pinion 15 carried by the gear 5, which latter gear engages the rack 11 carried by rod 12.

The operation of this embodiment of my invention is as follows: The pulley 3 being actuated by the pyrometer, raises or lowers rod 4 which moves the rod 12, and contacts 13 to the left or right, through the chain of gearing described, in a manner which will be readily understood, and closes the circuits to certain of the solenoids through their respective contacts. The energization of a pair of solenoids attracts ball Y which assumes a position between the two solenoids energized. The attraction of the ball Y to one side or the other of the fulcrum point of lever X disturbs the center of gravity and tilts the lever which accordingly moves spindle Z down or up and actuates the regulator to increase or decrease the flow of gas as heretofore described.

It will thus be seen that my invention provides for the maintenance of a constant heat irrespective of variations in the calorific value of the gas.

Fig. 2 also shows a regulator the loading of which is controlled by a calorimeter, or the like. On the gas regulator R is arranged a solenoid H the iron core of which is attached to a spring $f$. This spring $f$ acts on a lever $h$, which in turn acts on the spindle S of the regulator. The current connection for the solenoid H passes over the resistances C through the contact device B. A is a calorimeter which indicates variations of the calorific values by means of a pointer. To the pointer is connected a contacting device which in the present case is provided with a weight 2 dipping into a vessel containing mercury. According as the level of the mercury varies, fewer or more contacts of the contact devices are thrown into the circuit and according as fewer or more contacts are switched into the circuit, a stronger or weaker current will pass through the solenoid H and the spring $f$ will be put more or less under tension so that a greater load is thrown on the spindle S of the regulator. The various groups of resistances C are each adjustable so that the movement of the regulator R corresponding to the various contact steps can be adjusted according to the heating value of the calorimeter, or the like. These resistance groups C also permit of altering the lifting action of the solenoid H in accordance with the conditions of working. Experience shows in what proportion a variation of the load on the regulator is to take place so as to maintain the same temperature in the flame in accordance with the variation of the calorific effect, and care should be taken that the valves of the regulator are so constructed that an adjustment adapted to the required amounts passing through for producing a constant temperature can be effected. In carrying out this invention the contacts should be so adjusted that a correct regulation takes place so as to permit of the pointer coming to rest at the zero position.

I claim:

1. In a gas pressure regulator, the combination with a source of heating gas under pressure and a valve regulating the pressure thereof, of a member adapted to be moved to actuate said valve, a thermo-operated device arranged to be affected by the heat of the flames produced by the gas drawn from the source whose pressure is to be regulated, a plurality of electrical circuits, contacts in said circuits controlled by said thermo-operated device, and electrically operated means controlled by said circuits for moving said member to actuate said valve to its fully open or closed position or to an intermediate position to thereby control the pressure of the gas supply.

2. In a gas pressure regulator, the combination with a source of heating gas under pressure and a valve for regulating the pressure thereof, of a pivoted member for actuating said valve, a thermo-operated device arranged to be affected by the heat of the flames of the gas drawn from the source whose pressure is to be regulated, a plurality of electrical circuits, contacts in said circuits controlled by said thermo-operated device, and electrically operable means controlled by said circuits, said pivoted member having normally balanced forces on each arm and said electrically operable means increasing the force upon one or the other of said arms a variable amount when actuated by one of said circuits to cause a similar variation in the position of the gas regulating valve.

3. In a gas regulator, the combination with a source of heating gas under pressure and a valve for regulating the pressure thereof, of a pivoted member for actuating said valve, a thermo-operated device arranged to be affected by the heat of the flames of the gas drawn from the source whose pressure is to be regulated, a plurality of electrical circuits, contacts in said circuits controlled by said thermo-operated device on said member, said member being normally balanced and having a plurality of coils mounted thereon, and a member movable along said member controlled by said coils when energized, each of said coils being connected in one of said circuits controlled by said thermo-operated device.

JULIUS FABIAN.

Witnesses:
WOLDEMAR HAUPT,
HENRY HASPER.